(12) United States Patent
Scamardo et al.

(10) Patent No.: US 12,373,838 B1
(45) Date of Patent: Jul. 29, 2025

(54) TEMPORARY PAYMENT CARD SECURITY SYSTEM

(71) Applicant: United Services Automobile Association (USAA), San Antonio, TX (US)

(72) Inventors: Jennifer Anne Scamardo, Frisco, TX (US); Bradford James Kupka, Richardson, TX (US); Brett Andrew Walker, Plano, TX (US); Dwayne Phillip Wilson, Crossroads, TX (US); Patrick Emmanuel Gaston, Frisco, TX (US); Timothy Benjamin Czerlinsky, Dallas, TX (US); Kabita Bhandari, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 151 days.

(21) Appl. No.: 17/708,624

(22) Filed: Mar. 30, 2022

(51) Int. Cl.
G06Q 20/40 (2012.01)
G06Q 20/12 (2012.01)
G06Q 20/34 (2012.01)

(52) U.S. Cl.
CPC ....... *G06Q 20/4016* (2013.01); *G06Q 20/127* (2013.01); *G06Q 20/348* (2013.01); *G06Q 20/4015* (2020.05); *G06Q 20/407* (2013.01)

(58) Field of Classification Search
CPC ............. G06Q 20/4016; G06Q 20/127; G06Q 20/348; G06Q 20/4015; G06Q 20/407
See application file for complete search history.

(56) References Cited

U.S. PATENT DOCUMENTS

| | | | |
|---|---|---|---|
| 11,055,711 B1 | 7/2021 | Harman et al. | |
| 11,080,724 B1 * | 8/2021 | Arnott | H04W 4/021 |
| 11,354,673 B1 * | 6/2022 | Brock | G06Q 20/4018 |
| 11,556,936 B1 * | 1/2023 | Fisher | G06Q 20/3226 |
| 2007/0194113 A1 * | 8/2007 | Esplin | G06Q 20/40 705/16 |
| 2015/0348042 A1 * | 12/2015 | Jivraj | G06Q 20/326 705/44 |

(Continued)

FOREIGN PATENT DOCUMENTS

| | | | | |
|---|---|---|---|---|
| EP | 2287792 A1 * | 2/2011 | ......... | G06Q 20/202 |
| WO | WO-2020148658 A2 * | 7/2020 | ......... | G06F 16/535 |

OTHER PUBLICATIONS

"GeoXmart—A marketplace for geofence-based mobile services", Ulrich Bareth, 2010 34th annual IEEE computer software and applications conference, 2010 (Year: 2010).*

*Primary Examiner* — Duan Zhang
(74) *Attorney, Agent, or Firm* — Fletcher Yoder, PC

(57) ABSTRACT

A temporary payment card security system includes one or more processors and a memory storing instructions executable by the one or more processors to cause the one or more processors to generate a payment card associated with the account of the user in response to receiving an indication that a user associated with an account is attempting to complete a transaction with a merchant. The instructions are also executable by the one or more processors to cause the one or more processors to provide a respective unique payment card number of the payment card to a payment transaction system associated with the merchant.

17 Claims, 4 Drawing Sheets

(56) References Cited

U.S. PATENT DOCUMENTS

| | | | |
|---|---|---|---|
| 2016/0189123 A1* | 6/2016 | Lucia Specogna | ............................ G06Q 20/1085 705/43 |
| 2016/0321663 A1* | 11/2016 | Batlle | .................. G06Q 20/405 |
| 2020/0019964 A1* | 1/2020 | Miller | .............. G06Q 20/38215 |

* cited by examiner

TEMPORARY PAYMENT CARD SECURITY SYSTEM

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Payment cards (e.g., credit cards, debit cards, prepaid cards, gift cards) have made it more convenient for users to make purchases of goods and services. However, along with an increase in the use of payment cards, there has also been an increase in security issues (e.g., fraud, hacking, identity theft, cyberattacks) related to payment cards.

A payment card provider may enable a user or accountholder to disable or temporarily disable a payment card. However, the user may disable the payment card in response to occurrence and/or detection of suspicious activity involving the payment card. As such, the user may have already been a victim of fraud, hacking, identity theft, and/or cyberattacks by the time the user disables the payment card.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a temporary payment card security system includes one or more processors and a memory storing instructions executable by the one or more processors to cause the one or more processors to generate a payment card associated with the account of the user in response to receiving an indication that a user associated with an account is attempting to complete a transaction with a merchant. The instructions are also executable by the one or more processors to cause the one or more processors to provide a respective unique payment card number of the payment card to a payment transaction system associated with the merchant.

In one embodiment, a temporary payment card security system includes one or more processors and a memory storing instructions executable by the one or more processors to cause the one or more processors to receive a request for an additional payment card associated with an account of a user. The instructions are also executable by the one or more processors to cause the one or more processors to generate the additional payment card, assign one or more limitations to the additional payment card, wherein the one or more limitations comprise a purchase location limit, associate the additional payment card with the account of the user, and provide a representation of the additional payment card to a user device associated with the user for display on a display screen of the user device.

In one embodiment, a method of operating a temporary payment card security system includes receiving, at one or more processors, an indication that a user associated with an account is attempting to complete a transaction with a merchant. The method also includes generating, using the one or more processors, a payment card associated with the account in response to receiving the indication. The method further includes providing, using the one or more processors, a respective unique payment card number of the payment card to a payment transaction system associated with the merchant.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
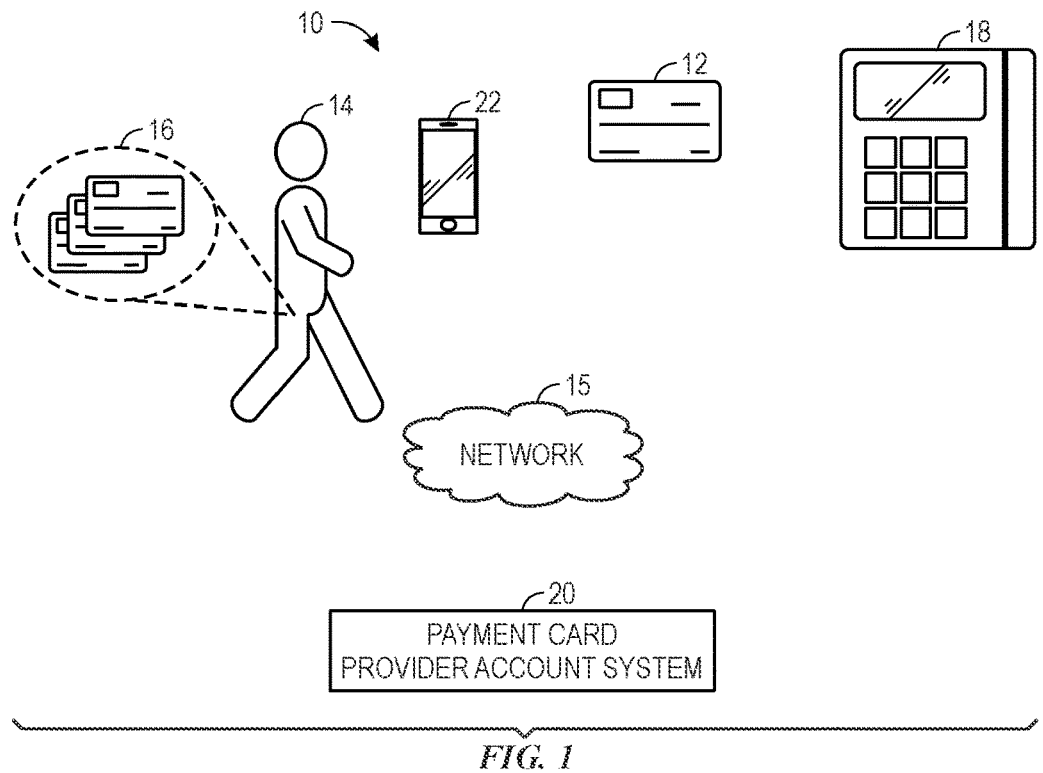
FIG. 1 is a schematic diagram of a temporary payment card security system that enables use of one or more payment cards to complete transactions, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to payment cards, and more particularly to systems and methods that utilize payment cards (e.g., physical, real payment cards and/or virtual payment cards) to provide security for an account of a user (e.g., a single account of an accountholder). In some embodiments, a temporary payment card security system may enable the user to create multiple temporary payment cards and/or may generate multiple temporary payment cards in response to certain actions. At least some of the multiple temporary payment cards may have one or more limitations, such as limitations with respect to purchase locations, purchase amounts, and/or purchase times. For example, the one or more limitations may make the multiple payment cards available for use for any suitable location, amount, and/or purchase times (e.g., available for use for about 180, 90, 60, 30, 10, 7, 3, 2, 1 day(s) or less). The temporary payment card security system may provide security for the account of the user in various ways, such as because only a specific one of the multiple temporary payment cards may be used with and/or stored by each merchant, and the specific one of the multiple temporary payment cards is associated with respective limitations. Furthermore, the temporary payment card security system may provide security for the account of the user due to detection of attempts to complete transactions that exceed the respective limitations. Indeed, the temporary payment card security system may efficiently identify suspicious transactions as they are occurring/being attempted, and thus, the temporary payment card security system may block and/or verify the suspicious transactions before they are completed. As discussed in more detail herein, the temporary payment security system may additionally or alternatively utilize a single payment card (e.g., physical, real payment card and/or virtual payment card) that is linked to multiple accounts of one or more users.

With the foregoing in mind, FIG. 1 is a diagram of a temporary payment card security system 10, in accordance with an embodiment of the present disclosure. A payment card 12 (e.g., credit card, debit card, prepaid card, gift card; physical, real payment card) associated with a user 14 may be used to perform a transaction. The transaction may be a payment for goods or services. For instance, the transaction may occur at a grocery store, retail store, gas station, and the like. In some embodiments, upon insertion of the payment card 12 into a payment card transaction device 18 (e.g., a point of sale (POS) terminal), the payment card transaction device 18 may read a payment card number stored on the payment card 12.

In some embodiments, account information associated with the payment card 12 may be used instead of the payment card 12 itself (e.g., instead of inserting the payment card 12 into the payment card transaction device 18). For example, the payment card number associated with the payment card 12 (e.g., printed on the payment card 12) may be entered via inputs into an application (e.g., software application) on the payment card transaction device 18 and/or on a user device 22 associated with the user 14 to perform the transaction (e.g., an online transaction). The user device 22 may be a mobile phone carried by the user 14, a personal computer operated by the user 14 or the like. The payment card transaction device 18, the payment card provider account system 20, and/or the user device 22 may be configured to communicate via a network 15 (e.g., the Internet).

In any case, the payment card transaction device 18 and/or the user device 22 may send the account information associated with the payment card 12 to a payment card provider account system 20. The account information may include the payment card number, a card expiration date, a billing address, a card security code (e.g., a Card Verification Value (CVV)), and/or a payment amount. In some cases, the account information may be sent to any number of intermediary parties before reaching the payment card provider account system 20. A payment card provider may have access to and/or operate the payment card provider account system 20, and the payment card provider may include a payment card network or association member that operates networks for processing payment card payments, an issuing bank or payment card issuer that issued the payment card 12, and the like. The intermediary parties may include an acquiring bank or a merchant's bank (e.g., a bank of a merchant selling the goods or services), an acquiring processor or service provider (e.g., a processor that provides a service or device enabling the merchant to accept payment cards), and the like. The payment card provider account system 20 may include one or more computing devices (e.g., servers, desktop computers) that manage respective accounts of multiple users and carry out a variety of tasks.

As shown, the user 14 may have access to and/or carry one or more additional payment cards 16. The payment card 12 and each of the one or more additional payment cards 16 may store a respective, unique payment card number. In some cases, the payment card 12 and each of the one or more additional payment cards 16 may be linked to a single account of the user 14. The single account of the user 14 may have only one account number and one balance, which increases with each refund and decreases with each purchase made with the payment card 12 and/or any of the one or more additional payment cards 16. In some embodiments, the single account of the user 14 is the only account of the user 14 that is managed by the payment card provider account system 20. However, it should be appreciated that the user 14 may have other accounts that are linked to respective account numbers, have respective balances, and/or are managed by the payment card provider account system 20.

The payment card 12 and each of the one or more additional payment cards 16 may each store their respective, unique payment card number in a magnetic strip, a chip, a barcode, or other feature or encoder (e.g., other physical feature or encoder printed, etched, or positioned on or in a flat body of the payment cards 12, 16; other physical feature or encoder with its purpose (e.g., only purpose) or functionality (e.g., only functionality) being to encode the payment card number and/or other account information to thereby enable reading of the payment card number and/or other account information via the payment card transaction device 18; configured to enable reading of the account information via contact and/or swiping at the payment card transaction device 18). In the present disclosure, these physical features or encoders (e.g., magnetic strips, chips, barcode, printed features, etchings) that encode the account information are referred to as physical encoders, which are physically integrated with (e.g., disposed on, formed in, attached to) the payment cards 12, 16.

In operation, the user 14 may submit a request (e.g., via phone call, electronic mail, online form) to the payment card provider account system 20 to request the one or more additional payment cards 16. For example, the user 14 may have the payment card 12 for everyday use to purchase groceries and other local and/or regular purchases. Additionally, the user 14 may request a first additional payment card 16 for restaurants, a second additional payment card 16 for an upcoming trip to a first destination, a third additional payment card for an upcoming trip to a second destination, and so on. Then, the payment card provider account system 20 may generate and print the additional payment cards 16 for the user 14. This may include linking the additional payment cards 16 to the account, activating the additional payment cards 16, and so on. The additional payment cards 16 may be mailed to the user 14, picked up form a physical store associated with the payment card provider, and/or printed at a kiosk (e.g., automated teller machine) for immediate collection by the user 14. In some embodiments, multi-factor authentication is utilized (e.g., must occur) to fulfill the request for the additional payment cards 16. For example, the user 14 is prompted to provide a username, a password, and also a passcode sent to a registered email address of the user 14 in order to submit the request for the additional payment cards 16.

In some embodiments, the user 14 and/or the payment card provider account system 20 may assign limitations to the payment card 12 and/or the one or more additional payment cards 16. The limitations may relate to purchase locations, purchase amounts, and/or purchase times. The purchase locations may include a single physical store, all physical stores of a single merchant, all physical stores and online platform of a single merchant, all physical stores of a category of merchants, all physical stores and online platforms of a category of merchants, and/or a geographical area that encompasses physical stores of various categories of merchants. The purchase amounts may include a maximum dollar amount. The purchase times may include a date range (e.g., about 180, 90, 60, 30, 10, 7, 3, 2, 1 day(s), or less; a single transaction or a number of transactions).

For example, the payment card 12 may have no limitations or may be limited to use at merchants categorized as grocery stores. However, the first additional payment card 16 may be limited to use at merchants categorized as restaurants and a maximum of $200 spending for a respective time period (e.g., expires at an end of each month). The second additional payment card 16 for the upcoming trip to the first destination may be limited to use at merchants categorized as travel vendors and/or located at the first destination, as well as maximum of $850 in spending for a respective time period that corresponds to respective dates of travel to the first destination. The third additional payment card 16 for the upcoming trip to the second destination may be limited to use at merchants categorized as travel vendors and/or located at the second destination, as well as a maximum of $1,000 in spending for a respective time period that corresponds to respective dates of travel to the second destination.

Then, when the user 14 (or unauthorized user) provides the respective payment card number of the payment card 12 to the payment card transaction device 18 of the grocery store, the payment card provider account system 20 may approve the transaction because the transaction satisfies and corresponds to the limitations of the payment card 12. However, when the user 14 (or unauthorized user) provides the respective payment card number of the first additional payment card 16 to the payment card transaction device 18 of the grocery store, the payment card provider account system 20 declines the transaction because the transaction does not satisfy or correspond to the limitations of the first additional payment card 16. Similarly, when the user 14 (or unauthorized user) provides the respective payment card number of the second additional payment card 16 to any payment card transaction device 18 outside of boundaries established for the first destination and/or outside of the respective time period, the payment card provider account system 20 declines the transaction because the transaction does not satisfy or correspond to the limitations of the second additional payment card 16. Thus, the multiple payment cards 12, 16 may make it more difficult for the unauthorized users to successfully complete fraudulent transactions using the multiple payment cards 12, 16 because the unauthorized users are not aware of the respective limitations for each of the multiple payment cards 12, 16.

The user 14 may select and/or change the limitations (e.g., via phone call, electronic mail, online form; upon making the request) based on preferences of the user 14. In some embodiments, the limitations may not be changed by the user 14, but instead only additional payment cards 16 may be requested and generated for the user 14. In some embodiments, multi-factor authentication is utilized (e.g., must occur) to enable the user 14 to select and/or change the limitations. Additionally or alternatively, the payment card provider account system 20 may automatically assign the limitations based on various factors, such as an account balance for the user 14, spending habits of the user 14, a category of merchants, a history of prior charges on the account of the user 14 for the same purpose (e.g., the same or substantially the same purpose), feedback/preferences/inputs from the user 14, a history of fraudulent charges on the account of the user 14, a history of fraudulent charges associated with a location of the user 14 (e.g., residence location, the first destination, the second destination, other destinations), a history of fraudulent charges associated with a category of merchants, or the like in response to the request for the additional payment card 16. The payment card provider account system 20 may access this data from any of a variety of data sources, such as one or more databases. In some embodiments, the payment card provider account system 20 may consider preferences of the user 14 and additional data. For example, the payment card provider account system 20 may optionally receive, from the user 14 via the user device 22, an input of a preferred purchase amount for the third additional payment card 16. Then, the payment card provider account system 20 may assign a lower purchase amount limit (e.g., lower than the preferred purchase amount) for the third additional payment card 16 if prior data indicates a high risk of fraudulent charges at the first destination (e.g., above a threshold, such as a threshold number per time period). However, the payment card provider account system 20 may assign a higher purchase amount limit (e.g., higher than the preferred purchase amount) for the third additional payment card 16 if prior data indicates a low risk of fraudulent charges at the first destination (e.g., below the threshold).

In some embodiments, in order to meet and provide the preferred purchase amount for the third additional payment card 16 even while the prior data indicates the high risk of security issues (e.g., at the first destination), the payment card provider account system 20 may automatically issue multiple payment cards for a specific purpose (e.g., for the travel to the first destination). Thus, the payment card provider account system 20 may generate one additional payment card 16 with a first purchase amount and another additional payment card 16 with a second purchase amount, wherein the first and second purchase amounts meet or exceed the preferred purchase amount. In this way, the payment card provider account system 20 may process the request from the user 14 and assess security risks associated with the request (e.g., in this case, at the first destination). Then, in response to the security risks being deemed too high for a single additional payment card 16, the payment card provider account system 20 may determine an appropriate number of additional payment cards 16 to issue to meet the request of the user 14 with a suitable level of security.

The payment card provider account system 20 may generate a particular number of additional payment cards 16 based on a risk level for the security issues, such as two additional payment cards 16 for a first high risk level (e.g., historically, one in every 1,000 charges at the first destination results in a security issue), three additional payment cards 16 for a second high risk level (e.g., historically, one in every 500 charges at the first destination results in a security issue), and so on. Thus, the user 14 is prepared to travel or carry out other specified actions/tasks, but the financial risk (e.g., to the user 14, the payment card provider, and/or the merchants) is mitigated due to the user 14 being provided with multiple additional payment cards 16 that each have respective limitations. It should be appreciated that similar techniques may be applied to provide a preferred purchase location and/or a preferred time period, even while the prior data indicates the high risk of security issues at the first destination. For example, an appropriate number of additional payment cards 16 may be issued, such as one additional payment card 16 per 100 mile radius and/or per day of travel. It should also be appreciated that the user 14 may not provide any input of their preferences for the limitations, but instead, the payment card provider account system 20 may assign the limitations and/or the number of additional payment cards based on analysis of the data.

Additionally or alternatively, the payment card provider account system 20 may assign the limitations based on spending habits of other users. In particular, the payment card provider account system 20 may consider other users that have used additional payment cards for the same purpose (e.g., the same or substantially the same purpose, such as for travel to the first destination for the same duration) to assign the limitations. For example, the payment card provider account system 20 may set a boundary around the first destination to define the limitation of the purchase location, and the boundary may be based on respective locations of various transactions completed by the other users with their own additional payment cards during travel to the first destination for the same duration. Thus, if no other users have left a particular radius from the first destination (e.g., 100 mile radius from a city center/airport/hotel that will be visited by the user 14), then the boundary may be set at the particular radius from the first destination or the particular radius with some additional margin/flexibility (e.g., 100 mile radius, plus an additional 10 mile radius). In some such cases, the other users may be selected to have characteristics similar to the user 14 (e.g., similar income, similar spending habits across their additional payment cards over time, similar spending habits across prior travel experiences).

It should be appreciated that the payment card provider account system 20 may also determine recommended limitation(s) using the data and/or techniques described herein. Then, the payment card provider account system 20 may provide the recommended limitations to the user device 22 for visualization by the user 14 and/or to facilitate input/selection by the user 14 to select the limitation(s). In this way, the payment card provider account system 20 may encourage the user 14 to adopt certain limitations, but also provide flexibility for the user 14 to customize the limitations for their additional payment cards 16.

It should be appreciated that the payment card provider account system 20 may utilize one or more algorithms, including one or more machine-learning algorithms that are trained on data (e.g., empirical and/or modeled data) related to purchases, security breaches, and the like to generate the additional payment cards 16 and/or to set the limitations for the additional payment cards 16. Furthermore, the one or more machine-learning algorithms may be updated over time using new data (e.g., collected data) related to purchases, security breaches, and the like as the user 14 uses their additional payment cards 16 and/or as other users use their additional payment cards.

In some embodiments, the payment card provider account system 20 may generate at least one of the additional payment cards 16 to be inoperable (e.g., never activated) to therefor facilitate identifying unauthorized users. For example, the account may be associated with at least one of the additional payment cards 16 (or in some cases the payment card 12) that is known to the user to be inoperable, and thus any use of the inoperable payment card(s) may initiate an alert (e.g., to the user 14, to the merchant, and/or to authorities, such as a police department) and/or result in the attempted transaction being blocked.

Figure 2:
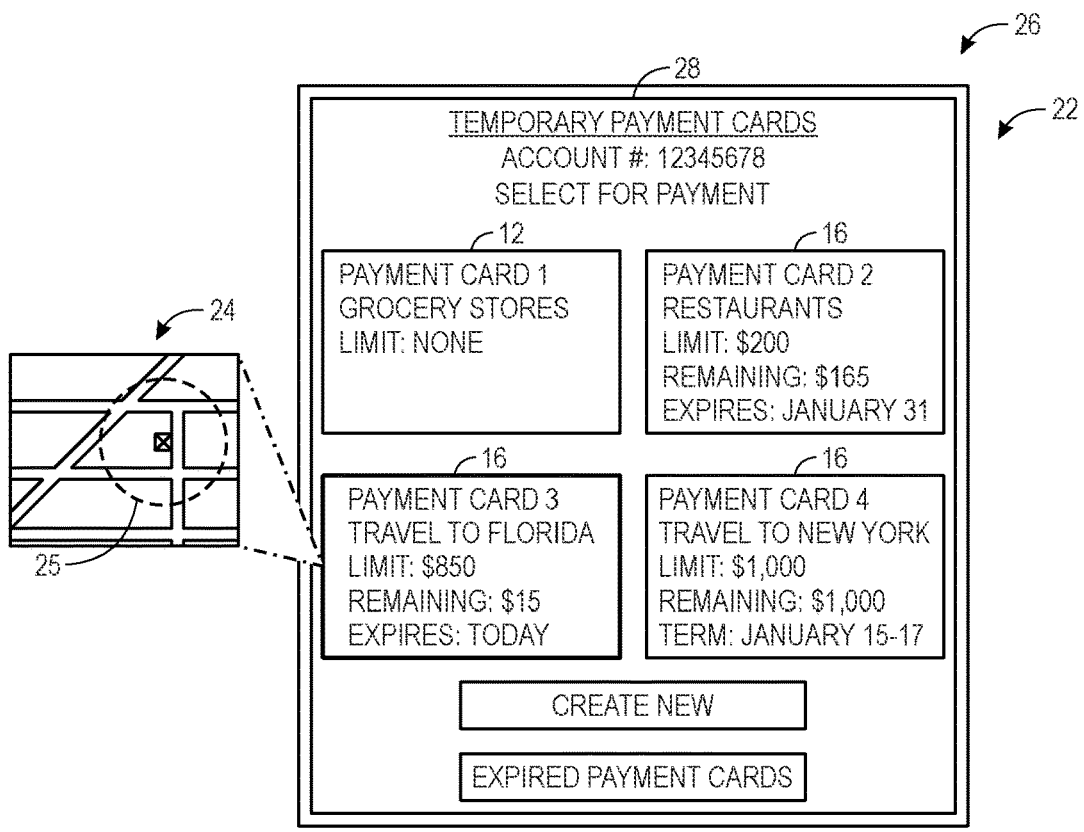
FIG. 2 is an example of a graphical user interface that may be presented on a display of a user device to enable visualization of multiple payment cards that are available to a user, in accordance with an embodiment of the present disclosure.

FIG. 2 is an example of a graphical user interface (GUI) 26 that may be presented on a display 28 of the user device 22 to enable visualization of multiple payment cards 12, 16 that are available to the user 14, in accordance with an embodiment of the present disclosure. The GUI 26 may be presented upon the user 14 carrying out certain steps to access an application on the user device 22. For example, the user 14 may select an icon to open the application and then input login information (e.g., user name, password, and/or a passcode provided to a registered email address; multi-factor authentication) to obtain access to the GUI 26. As shown, the GUI 26 shows a single account number that is linked to four payment cards, which may correspond to the payment card 12 and the additional payment cards 16 described with reference to FIG. 1. The GUI 26 may provide a short description of each of the multiple payment cards 12, 16, such as the limitations pertaining to the purchase location, the purchase amount, and/or the purchase times.

The GUI 26 may also include selectable icons that essentially operate as a menu for the user 14. For example, each representation of the multiple payment cards 12, 16 may be selectable to enable the user 14 to view additional details about the respective limitations, including a map 24 with a boundary 25 and/or a written description of the boundary 25 for the purchase location, prior charges and/or pending charges, or the like. In some embodiments, the GUI 26 may enable the user 14 to modify the boundary 25 for the purchase location. For example, the user 14 may select/drag edges of the boundary 25 and/or draw a new boundary onto the map 24 (e.g., when the display 28 is a touchscreen display; using an editing tool in the application).

As another example, the GUI 26 may enable the user to select a "Create New" icon to complete a request for a new additional payment card 16 and/or an "Expired Payment Cards" icon to view expired payment cards. As another example, the GUI 26 may enable the user to select an "Account #" icon to view a balance of the account, all prior and/or pending transactions for the account (e.g., regardless of which of the multiple payment cards 12, 16 was used; in a single list sorted by date and/or by payment card number). It should be appreciated that the features illustrated in the GUI 26 of FIG. 2 are merely exemplary. Thus, certain features and/or information shown in FIG. 2 may be omitted and/or other features and/or information may be added.

It should also be appreciated some or all of the multiple payment cards 12, 16 shown and described herein may additionally or alternatively be virtual payment cards. The virtual payment cards may not be represented or embodied in any physical substrate or body (e.g., unlike the physical, real payment cards shown in FIG. 1, the virtual payment cards do not have respective flat bodies with respective physical encoders that encode respective, unique payment card numbers). Instead, the virtual payment cards are stored as sets of data (e.g., including respective payment card numbers) in one or more storage devices, such as a storage device of the user device 22 and/or a storage device of the payment card provider account system 20.

The virtual payment cards may enable the user to complete transactions (e.g., in-person), such as via communication between the user device 22 and the payment card transaction device 18. For example, the user 14 may bring the user device 22 in proximity to the payment card transaction device 18 to establish communication between the user device 22 and/or the payment card transaction device 18. Then, the user 14 may select one of the virtual payment cards referenced in the GUI 26, and the selected one of the virtual payment cards is communicated to the payment card transaction device 18 to proceed with the transaction. As another example, the virtual payment cards may enable the user 14 to complete transactions (e.g., online transactions) via inputs into an application on the payment card transaction device 18 and/or on the user device 22.

In any case, the virtual payment cards may have certain advantages over the physical, real payment cards. For example, the virtual payment cards may be more quickly generated by the payment card provider account system 20 and/or may be more quickly made available for use by the user 14 in response to receipt of the request to create a new additional payment card. Furthermore, the virtual payment cards may be less cumbersome for the user 14, as the virtual payment cards may be maintained in the storage device rather than physically carried by the user. Furthermore, the payment card provider account system 20 may automatically remove the virtual payment cards from the GUI 26 (e.g., removed to an "Expired Payment Cards" folder; faded in color/grayed out; not selectable for payment) in response to expiration of the respective time period or at some time after the expiration of the respective time period (e.g., after a certain number of days, such as 10 days; set by the user 14; faded in color/grayed out; not selectable for payment). The payment card provider account system 20 may also automatically remove the virtual payment cards from the GUI 26 (e.g., removed to an "Expired Payment Cards" folder; faded in color/grayed out; not selectable for payment) in response to depletion of all available funds (e.g., the purchase amount). This may be more efficient and make it easier for the user 14 to manage the multiple payment cards (particularly a large number of payment cards, such as 5, 10, 15, 20, or more) as the expired payment cards are not available for selection and/or are not visible when the user 14 views various payment options via the GUI 26.

Similarly, in some embodiments, the payment card provider account system 20 may automatically remove the virtual payment cards from the GUI 26 (e.g., removed to an "Unavailable Payment Cards" folder; faded in color/grayed out; not selectable for payment) based on various factors, such as a current location of the user 14 (e.g., based on location data received from the user device 22). For example, if the current location corresponds to a grocery store, the GUI 26 may only present the payment card(s) that are permitted to be used in the grocery store. The GUI 26 may also only present the virtual payment card(s) that are permitted to be used at a current time and/or an upcoming time window (e.g., within the next 24 hours). The GUI 26 may also only present the virtual payment card(s) that have available funds (e.g., the purchase amount). This may be more efficient and make it easier for the user 14 to manage the multiple payment cards as the unavailable payment cards are not available for selection and/or are not visible when the user 14 views various payment options via the GUI 26. The virtual payment cards may have any suitable characteristics of the multiple payment cards 12, 16 described herein (e.g., the limitations). Furthermore, hiding and/or removing the expired payment card(s) and/or the unavailable payment card(s) from the GUI 26 may also be carried out in connection with the physical, real payment cards 12, 16, as this may provide a more accurate picture of the physical, real payment cards 12, 16 that are available for use by the user 14.

In some embodiments, the payment card provider account system 20 may generate an additional payment card based on an indication that the user 14 is attempting to complete a transaction. For example, a single payment card (e.g., a physical, real payment card or a virtual payment card; the payment card 12 or any of the additional payment cards 16) may be used to automatically generate one or more additional payment cards (e.g., any of the other additional payment cards 16). For example, the payment card 12 may be considered to be a primary payment card. Then, in response to receiving an indication of selection of the payment card 12 via the GUI 26 and/or that the payment card number of the payment card 12 has been inserted at the payment card transaction device 18, the payment card provider account system 20 may generate an additional payment card 16 (e.g., a virtual payment card; having respective account information, such as at least a respective, unique payment card number). Then, the payment card provider account system 20 may provide at least some of the respective account information, such as at least the respective, unique payment card number, to the payment card transaction device 18 and/or the user device 22. In this way, the payment card provider account system 20 may essentially transform the single payment card 12 into multiple different additional payment cards 16 with respective, unique payment card numbers in a responsive, dynamic manner (e.g., when the user 14 attempts to complete a transaction with the single payment card 12; during the transaction).

Advantageously, in some embodiments, the user 14 may not perform extra steps (e.g., other than selecting and/or providing the payment card number for the single payment card 12 to the payment card transaction device 18, such as by inserting the single payment card into the payment card transaction device 18) in order for the payment card provider account system 20 to generate the additional payment card 16. Indeed, the user 14 may not receive any indication that this process to transform the single payment card 12 and/or to provide the account information for the additional payment card 16 to the payment card transaction device 18 is or has occurred (e.g., other than the user 14 may understand that this has occurred due to the transaction being approved/proceeding, should the process be described in account description materials for the user 14).

However, in some embodiments, the user 14 may receive confirmation that the payment card provider account system 20 has generated the additional payment card 16, such as via a displayed indication on the payment card transaction device 18 and/or the user device 22. For example, the payment card transaction device 18 and/or the user device 22 may display the respective, unique account number (or some portion thereof) of the additional payment card 16 for visualization by the user. This may occur during the transaction and/or after the transaction. In some embodiments, when this occurs during the transaction, the user 14 and/or the merchant may be prompted to confirm acceptance of the additional payment card 16. In response to the acceptance, the payment card provider account system 20 may then approve the transaction. In some embodiments, when this occurs after the transaction, the user 14 and/or the merchant may be prompted to confirm that they would like to store the additional payment card 16 on the user device 22 and/or in the payment card transaction device 18 (or in a payment card transaction system, which may include one or more payment card transaction devices 18 and/or one or more servers associated with the merchant).

In some embodiments, when generated in this way (e.g., in response to the transaction), the additional payment card 16 may be a one-time use payment card and may not be reused for future transactions. However, in some cases, the additional payment card 16 may be a one-time purchase payment card and may not be reused for future purchases, although it may be reused only for related refunds/returns. In such cases, the additional payment card 16 may provide enhanced security at least due to the additional payment card 16 being provided to the payment card transaction device 18 for storage of the additional payment card 16 in association with the transaction (instead of the payment card number of the single payment card 12 that can be reused). Furthermore, the user 14 may benefit from multiple additional payment cards 16 without having to carry multiple additional payment cards 16 and/or view/select from the multiple additional payment cards 16.

In some embodiments, when generated in this way (e.g., in response to the transaction), the additional payment card 16 may be a multi-use payment card and may be reused for future transactions. Thus, simply by providing the payment card number for the single payment card 12 to the payment card transaction device 18 or otherwise providing an indication of an intent to use the single payment card 12 to complete a transaction (e.g., inputting the payment card number into an application on the user device 22), the payment card provider account system 20 may generate the additional payment card 16, which may be any of the one or more additional payment cards 16 shown and described with respect FIGS. 1 and 2, for example. Thus, upon inserting the single payment card 12 at the payment card transaction device 18 and/or selecting the single payment card 12 to use for payment in the application on the user device 22, the payment card provider account system 20 may receive an indication of an intent to use the single payment card 12 to complete the transaction. Then, the payment card provider account system 20 may generate the additional payment card 16, provide the additional payment card 16 to the payment card transaction device 18 and/or to the user device 22. The payment card provider account system 20 may also automatically complete the transaction with the additional payment card 16 so that transaction records include the additional payment card 16 and/or to enable the merchant to store the additional payment card 16. However, it should be appreciated that the payment card provider account system 20 may instead wait for confirmation from the user 14 in order to complete the transaction with the additional payment card 16.

Figure 3:
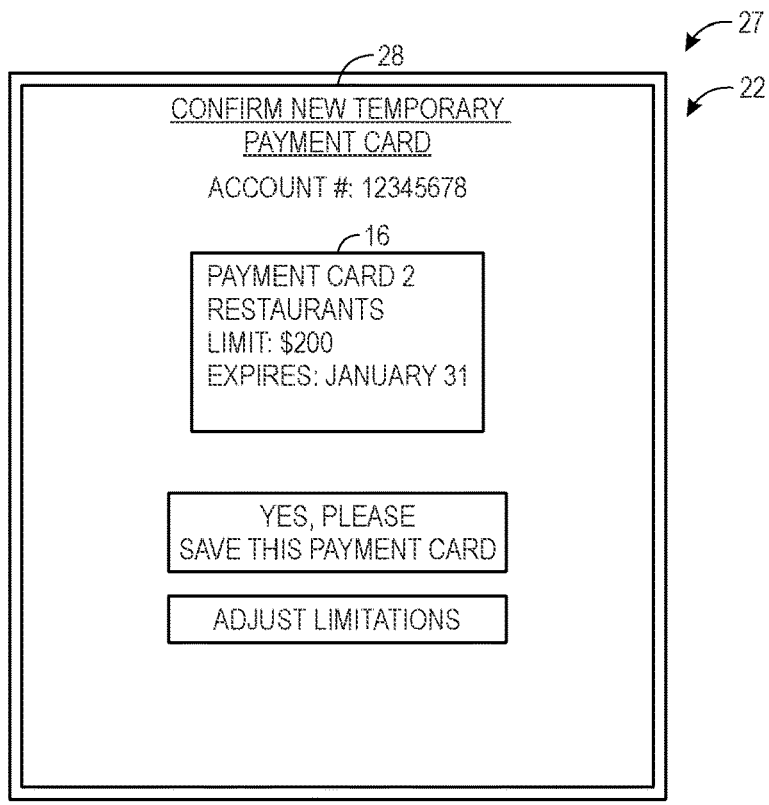
FIG. 3 is an example of a graphical user interface that may be presented on a display of a user device to enable visualization of an additional payment card generated for a user, in accordance with an embodiment of the present disclosure.

For example, FIG. 3 is an example of a graphical user interface (GUI) 27 that may be presented on the display 28 of the user device 22 to enable visualization of the additional payment card 16 generated for the user 14, in accordance with an embodiment of the present disclosure. The GUI 27 may be presented upon the user 14 selecting and/or providing the payment card 12 for a transaction. For example, the user 14 may select the icon in FIG. 2 that represents the payment card 12 while the user device 22 is in communication with the payment card transaction device 18, or the user 14 may input the payment card number of the payment card 12 to initiate an online transaction (e.g., with a restaurant). The user device 22 and/or the payment card transaction device 18 may provide an indication of the attempt to complete the transaction to the payment card provider account system 20. In response, the payment card provider account system 20 may generate the additional payment card 16 and provide the account information for the additional payment card 16 to the user device 22 for display as part of the GUI 27. The GUI 27 may also prompt the user to confirm the additional payment card 16, such as by clicking "Yes, please save this payment card." The selection may prompt the additional payment card 16 to be saved in association with the account of the user 14 by the payment card provider account system 20, the additional payment card 16 to be provided to the payment card transaction device 18 (or system), and/or the transaction to proceed with the additional payment card 16. The user 14 may be prompted to input login information (e.g., user name, password, and/or passcode; multi-factor authentication) to obtain access to the GUI 27 and/or to confirm the additional payment card 16.

The GUI 27 may also include selectable icons that essentially operate as a menu for the user 14. For example, the GUI 27 may enable the user to select an "Adjust Limitations" icon to change the limitations for the additional payment card 15. It should be appreciated that the features illustrated in the GUI 27 of FIG. 3 are merely exemplary. Thus, certain features and/or information shown in FIG. 3 may be omitted and/or other features and/or information may be added.

In any case, the payment card provider account system 20 may prompt the user 14 to input limitations for the additional payment card 16 and/or may automatically create the limitations for the additional payment card 16. The limitations may relate to purchase locations, purchase amounts, and/or purchase times. The payment card provider account system 20 may enable subsequent transactions between the user 14 (e.g., upon presenting either the respective, unique payment card number of the single payment card 12 and/or the respective, unique payment card number of the additional payment card 16) according to the limitations (e.g., within respective purchase amounts and/or purchase times). In some embodiments, the payment card provider account system 20 may not issue another additional payment card 16 for use between the user 14 and the merchant unless the limitations of the additional payment card 16 are reached or exceeded (e.g., over respective purchase amounts and/or purchase times). However, once the limitations are reached or exceeded, the next time that the user 14 selects or presents either the respective, unique payment card number of the single payment card 12 and/or the respective, unique payment card number of the additional payment card 16 for a transaction with the merchant, the payment card provider account system 20 may issue yet another additional payment card 16, and so on. In this way, the user 14 may have very little involvement or take no (or minimal) active steps to receive the benefits of the enhanced security provided by the additional payment cards 16. Furthermore, the merchant may store the additional payment card(s) 16 so that the user 14 can return to efficiently complete future purchases (e.g., using the stored additional payment card 16, such as via confirmation/selection at check-out online and/or via the payment card transaction device 18; instead of swiping and/or manually entering any unique payment card number for each purchase), but with the benefits of the enhanced security provided by the additional payment cards 16 and their respective limitations.

Figure 4:
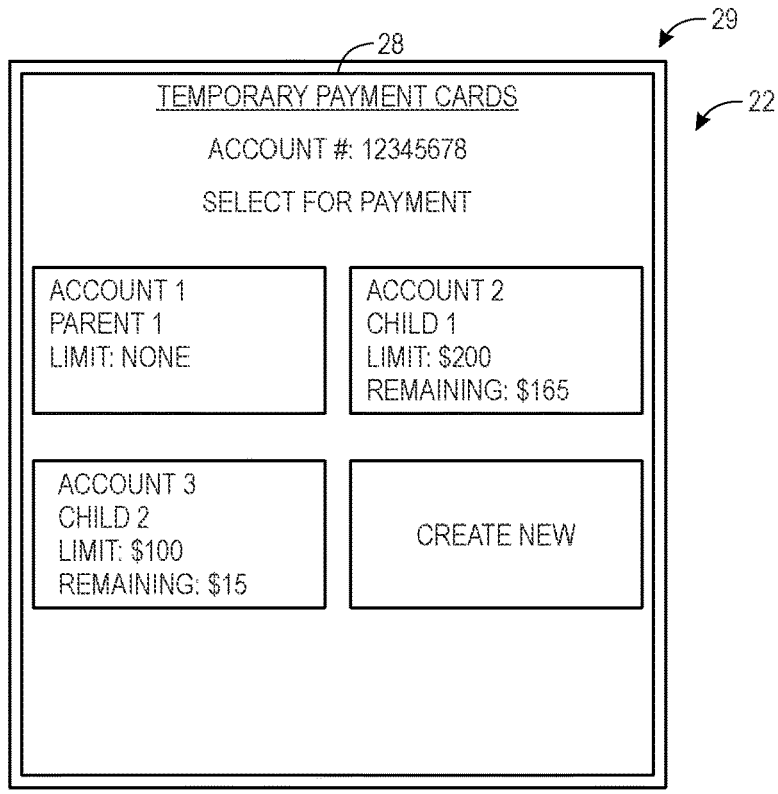
FIG. 4 is an example of a graphical user interface that may be presented on a display of a user device to enable visualization of multiple accounts linked to a single payment card, in accordance with an embodiment of the present disclosure.

In some embodiments, a single payment card (e.g., a physical, real payment card or a virtual payment card) may be used to link to multiple accounts of one or more users (e.g., a parent and their child(ren)). Thus, in response to receiving a request via the user device 22 and/or an indication that the payment card number for the single payment card has been provided to the payment card transaction device 18, the payment card provider account system 20 may retrieve and instruct display of an indication of the multiple accounts of the one or more users. The indication may be presented on the payment card transaction device 18 and/or the user device 22 to enable selection of one of the multiple accounts by the user 14. In this way, the user 14 may carry and use one (e.g., only one) physical, real payment card to be able to withdraw and/or deposit funds into multiple accounts. FIG. 4 is an example of a graphical user interface (GUI) 29 that may be presented on the display 28 of the user device 22 to enable visualization of the multiple accounts that are linked together via the single payment card, in accordance with an embodiment of the present disclosure. The GUI 29 may be presented upon the user 14 carrying out certain steps to access an application on the user device 22. For example, the user 14 may select an icon to open the application and then input login information (e.g., user name, password, and/or biometric information) to obtain access to the GUI 29. As shown, the GUI 29 shows a single payment card number that is linked to three account numbers, which may be owned by one or more users. The GUI 29 may provide a short description of each of the multiple accounts, such as the accountholder and/or limitations pertaining to the purchase location, the purchase amount, and/or the purchase times.

The GUI 29 may also include selectable icons that essentially operate as a menu for the user 14. For example, each representation of the multiple accounts may be selectable to enable the user 14 to view additional details about the respective limitations, including prior charges and/or pending charges. The GUI 29 may enable the user to select a "Create New" icon to complete a request for a new account that is linked to the single payment card number. It should be appreciated that the features illustrated in the GUI 29 of FIG. 4 are merely exemplary. Thus, certain features and/or information shown in FIG. 4 may be omitted and/or other features and/or information may be added.

Figure 5:
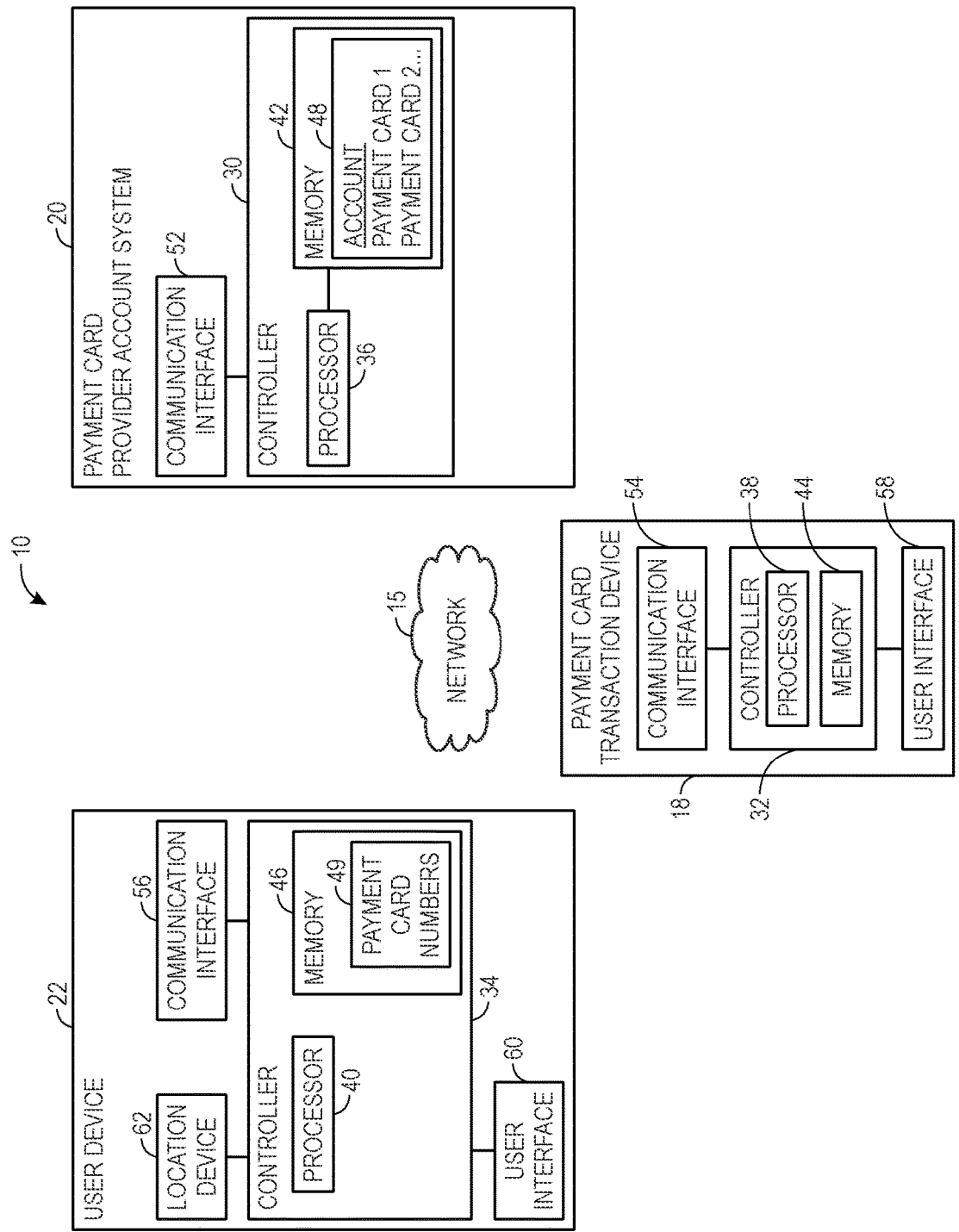
FIG. 5 is a block diagram of the temporary payment card security system of FIG. 1, in accordance with an embodiment of the present disclosure.

FIG. 5 is a block diagram of the temporary payment card security system 10 of FIG. 1, in accordance with an embodiment of the present disclosure. As shown, the temporary payment card security system 10 may include the payment card transaction device 18, the payment card provider account system 20, and the user device 22 of the user 14. In some embodiments, the payment card transaction device 18 may be a dedicated payment card transaction device, such as a POS terminal in a physical store. In some embodiments, the payment card transaction device 18 may be a communication device that enables the user 14 to complete transactions with the user device 22.

Each of the payment card transaction device 18, the payment card provider account system 20, and the user device 22 may include a respective controller 30, 32, 34 that includes one or more respective processors 36, 38, 40 and one or more respective memory devices 42, 44, 46. The one or more processors 36, 38, 40 (e.g., microprocessors) may execute software programs and/or instructions relating to payment card transactions. Moreover, the one or more processors 36, 38, 40 may include multiple microprocessors, one or more "general-purpose" microprocessors, one or more special-purpose microprocessors, and/or one or more application specific integrated circuits (ASICS), or some combination thereof. For example, the one or more processors 36, 38, 40 may include one or more reduced instruction set (RISC) processors. The one or more memory devices 42, 44, 46 may store information such as control software, look-up tables, configuration data, and the like. The one or more memory devices 42, 44, 46 may include a tangible, non-transitory, machine-readable-medium, such as a volatile memory (e.g., a random-access memory (RAM)) and/or a nonvolatile memory (e.g., a read-only memory (ROM)). The one or more memory devices 42, 44, 46 may include one or more storage devices (e.g., nonvolatile storage devices) that may include read-only memory (ROM), flash memory, a hard drive, and/or any other suitable optical, magnetic, or solid-state storage medium.

The one or more memory devices 42, 44, 46 may store a variety of information and may be used for various purposes. For example, the one or more memory devices 42, 44, 46 may store machine-readable and/or processor-executable instructions (e.g., firmware or software) for the one or more processors 36, 38, 40 to execute, such as instructions relating to payment card transactions. In some embodiments, the one or more memory devices 42 of the payment card provider account system 20 may store respective account information 48 for respective accounts of multiple users. For a single account that is linked to multiple payment cards, the account information 48 may include an account number, multiple payment card numbers, an accountholder name, a billing address, an account history, an accountholder contact information, and the like. The account information 48 may also include respective limitations for each of the multiple payment card numbers that are associated with the single account. In some embodiments, the one or more memory devices 46 of the user device 22 may store some or all of the respective account information 48 for the respective accounts of the user 14 (e.g., any of the respective account information 48; at least sufficient to identify the account of the user 14). For example, as shown, the one or more memory devices 46 of the user device 22 stores the multiple payment card numbers 49 of the respective account information 48. For a single payment card that is linked to multiple accounts, the one or more memory devices 42 of the payment card provider account system 20 may store respective account information 48 that includes the payment card number in association with the multiple accounts.

Each of the payment card provider account system 20, the payment card transaction device 18, and the user device 22 may also include a respective communication interface 52, 54, 56 communicatively coupled to the respective controllers 30, 32, 34 that enables the respective controllers 30, 32, 34 to communicate with each other with any suitable communication network 15. For example, the communication interface 52, 54, 56 may enable the controllers 30, 32, 34 to communicate with wireless networks (e.g., mobile, Wi-Fi, LAN, WAN, Internet).

Each of the payment card transaction device 18 and the user device 22 may include a respective user interface 58, 60 communicatively coupled to the respective controllers 32, 34 that enables the respective controllers 32, 34 to display output and/or receive input from the user 14. For example, the user interface 58 of the payment card transaction device 18 may include any suitable input and output devices, such as a display, a touchscreen, a stylus, a keypad, a card reader, and the like, to enable the user 14 to perform a transaction. The user interface 58 of the user device 22 may also include any suitable input and output devices, such as a display (e.g., the display 28 of FIG. 2), a touchscreen, a stylus, a keypad, buttons, a camera, and the like, to enable the user 14 to send and receive data.

The user device 22 may also include a location device 62 communicatively coupled to the controller 34 that enables the controller 34 to determine a location of the user device 22. For example, the location device 62 may receive global positioning system (GPS) signals, a different type of GPS-related signal, or other signals of another location protocol that determine the location of the user device 22. The payment card transaction device 18 may also be registered to a location (e.g., a physical store) and/or include a location device that detects a respective location of the payment card transaction device 18 and that provides the respective location to the payment card provider account system 20.

Figure 6:
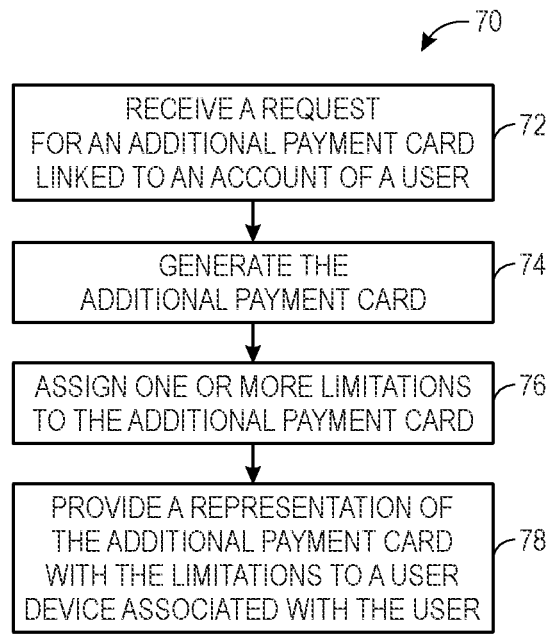
FIG. 6 is a flow diagram of a method of using the temporary payment card security system of FIG. 1 to generate an additional payment card, in accordance with an embodiment of the present disclosure.

FIG. 6 is a flow diagram of a method 70 of using the temporary payment card security system 10 of FIG. 1 to generate an additional payment card, in accordance with an embodiment of the present disclosure. The following description of the method 70 is described as being performed by a processing system (e.g., the payment card provider account system 20), but it should be noted that any suitable processor-based device or system may be specially programmed to perform any of the methods described herein. Moreover, although the following description of the method 70 is described as including certain steps performed in a particular order, it should be understood that the steps of the method 70 may be performed in any suitable order, that certain steps may be omitted, and/or that certain steps may be added.

In block 72, the method 70 may begin by receiving a request for one or more additional payment cards linked to an account of a user. In some embodiments, the user may submit a request (e.g., via phone call, electronic mail, online form) to the payment card provider account system to request the one or more additional payment cards. For example, the user may have the payment card for everyday use to purchase groceries and other local and/or regular purchases. Additionally, the user may request a first additional payment card for restaurants, a second additional payment card for an upcoming trip to a first destination, a third additional payment card for an upcoming trip to a second destination, and so on.

As described herein, the request may be made by the user attempting to complete a transaction with a particular payment card (e.g., a primary payment card; an original payment card; a physical, real payment card or a virtual payment card). For example, upon inserting the particular payment card at the payment card transaction device and/or selecting the particular payment card to use for payment in the application on the user device, the payment card provider account system may consider this indication of an intent to use the single payment card to complete the transaction to be the request for the one or more additional payment cards.

In block 74, the method 70 may continue by generating the one or more additional payment cards for the user. The one or more additional payment cards may include a physical, real payment card and/or a virtual payment card. Each of the one or more additional payment cards has a unique, respective payment card number.

In block 76, the user and/or the payment card provider account system may assign limitations to the one or more additional payment cards. The limitations may relate to purchase locations, purchase amounts, and/or purchase times. Furthermore, the respective limitations may be different for the multiple payment cards (e.g., have respective purchase locations, respective purchase amounts, and/or respective purchase times). The limitations may be assigned by the user based on the preferences of the user. The limitations may be assigned by the payment card provider account system based on the account balance for the user, spending habits for the user, a category of merchants, and/or historical information (e.g., prior fraudulent charges; spending habits of other users). In some cases, the payment card provider account system may provide recommended limitations, and the user may make changes to the recommended limitations (e.g., by expanding or redrawing a boundary that defines the purchase location).

In block 78, the method 70 may continue by providing a representation of the one or more additional payment card with the limitations via a user device associated with the user. This may enable the user to view the one or more additional payment cards and/or efficiently select one of the one or more additional payment cards for a transaction. The method 70 may include other features described herein. For example, in some embodiments, the payment card provider account system may mail a physical, real additional payment card to the user. The method 70 may include multi-factor authentication in order to enable the user to request the one or more additional payment cards and/or to assign the limitations. Furthermore, some or all of the one or more additional payment cards may be a one-time use payment card (e.g., the one-time use is the limitation), such as only for completion of a current transaction and/or a related transaction (e.g., future return of an item being purchased). However, some or all of the one or more additional payment cards may be a multi-use payment card that may be reused for future transactions according to the limitations.

Figure 7:
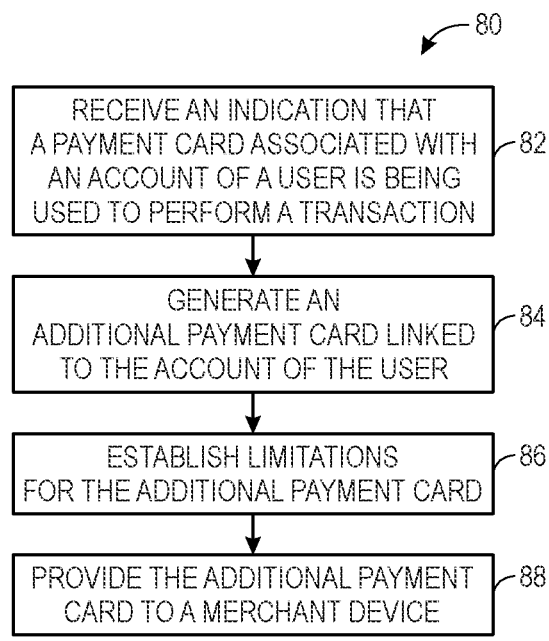
FIG. 7 is a flow diagram of a method of using the temporary payment card security system of FIG. 1 to generate an additional payment card based an indication that a user associated with an account is attempting to complete a transaction, in accordance with an embodiment of the present disclosure.

FIG. 7 is a flow diagram of a method 80 of using the temporary payment card security system 10 of FIG. 1 to generate an additional payment card based on an indication that a user associated with an account is attempting to complete a transaction, in accordance with an embodiment of the present disclosure. The following description of the method 80 is described as being performed by a processing system (e.g., the payment card provider account system 20), but it should be noted that any suitable processor-based device or system may be specially programmed to perform any of the methods described herein. Moreover, although the following description of the method 80 is described as including certain steps performed in a particular order, it should be understood that the steps of the method 80 may be performed in any suitable order, that certain steps may be omitted, and/or that certain steps may be added.

In block 82, the method 80 may begin by receiving an indication that a user associated with an account is attempting (e.g., is currently attempting or is expected to attempt) to complete a transaction. The indication may include an indication that a payment card (e.g., a primary payment card;

an original payment card; a physical, real payment card or a virtual payment card) associated with the account has been selected by the user via an input at a user device of the user, entered into a fillable form on a website associated with a merchant, and/or has been presented to the payment card transaction device associated with the merchant. The indication may include other events, such as a location of the user device associated with the user being within a physical store of the merchant (e.g., as indicated by location data from a location device of the user device).

In block 84, the method 70 may continue by generating the additional payment card for the user in response to receipt of the indication. The additional payment card may include a virtual payment card. However, it is envisioned that the additional payment card may include a physical, real payment card and/or the virtual payment card (e.g., a virtual payment card for the transaction, with a physical, real version of the payment card to be mailed to the user at a later time). The additional payment card has a unique, respective payment card number.

In block 86, the user and/or the payment card provider account system may assign limitations to the one or more additional payment cards. The limitations may relate to purchase locations, purchase amounts, and/or purchase times. The limitations may be assigned by the user based on the preferences of the user. The limitations may be assigned by the payment card provider account system based on the account balance for the user, spending habits for the user, a category of merchants, and/or historical information (e.g., prior fraudulent charges; spending habits of other users). In some cases, the payment card provider account system may provide recommended limitations, and the user may make changes to the recommended limitations (e.g., by expanding or redrawing a boundary that defines the purchase location).

In block 88, the method 80 may continue by providing the additional payment card with the limitations to the payment card transaction device (or system associated with the merchant). This may enable the payment card transaction device to efficiently obtain and store the additional payment card in association with the transaction. The method 80 may include other features described herein. For example, the method 70 may include multi-factor authentication and the additional payment card may be a one-time use payment card (e.g., the one-time use is the limitation) or a multi-use payment card (e.g., may be reused for future transactions according to the limitations).

As described herein, the methods 70, 80 may rely on active participation from the user. For example, the user may make the request via the user device, provide inputs at the user device to select the limitations, view the additional payment card on the user device, and/or select the additional payment card to complete the transaction. However, the methods 70, 80 may rely upon minimal participation and/or awareness from the user. For example, the user may insert a particular payment card into the payment card transaction device, which then provides the request for the additional payment card to the payment card provider account system. The payment card provider account system then generates the limitations and provides the additional payment card to the merchant (e.g., only the merchant).

Aspects of the systems and methods disclosed herein may provide performance or efficiency benefits for improving security of account(s) for users. Aspects may save resources such as processing and/or memory, such as by automatically generating an additional payment card(s) for the user in response to an indication of an attempt to complete a transaction and/or automatically generating one or more limitations for the additional payment card(s). Aspects may save memory through automatic filtering, such as via removal of unavailable and/or expired payment cards based on a location and/or other factor(s). While only certain features of the invention have been illustrated and described herein, many modifications and changes will occur to those skilled in the art. It is, therefore, to be understood that the appended claims are intended to cover all such modifications and changes as fall within the true spirit of the invention. It should be appreciated that any of the features described with reference to FIGS. 1-7 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A temporary payment card security system, comprising:
   one or more processors;
   memory storing instructions executable by the one or more processors to cause the one or more processors to:
      set a boundary for a merchant location based on respective location data of prior transactions completed at the merchant location;
      determine that a user is at the merchant location of the merchant based on location data of a user device associated with the user being within the boundary for the merchant location, wherein the location data of the user device is indicated by global positioning system (GPS) location signals received from the user device;
      assess security factors associated with the merchant location of the merchant, wherein the security factors are indicative of a risk of fraudulent transactions;
      in response to determining that the user is at the merchant location of the merchant and in response to receiving an indication that the user is attempting to complete a transaction with the merchant, generate a payment card associated with an account of the user and with one or more limitations based on the security factors associated with the merchant location of the merchant;
      provide a respective unique payment card number of the payment card to a payment transaction system associated with the merchant;
      instruct display of a representation of the payment card to the user device associated with the user for display on a display screen of the user device, wherein the representation is selectable to enable the user to view details about the one or more limitations, wherein the details comprise a visualization of the boundary for the merchant location overlaid onto a map; and
      instruct removal of the representation of the payment card from the display screen of the user device based on new location data of the user device indicating the user is no longer within the boundary for the merchant location.

2. The temporary payment card security system of claim 1, wherein the instructions are executable by the one or more processors to cause the one or more processors to assign the one or more limitations to the payment card.

3. The temporary payment card security system of claim 2, wherein the instructions are executable by the one or more processors to cause the one or more processors to block future transactions with the payment card that do not correspond to the one or more limitations.

4. The temporary payment card security system of claim 2, wherein the instructions are executable by the one or more processors to cause the one or more processors to generate the one or more limitations based on a current balance of the account of the user, spending habits of the user, or both.

5. The temporary payment card security system of claim 2, wherein the instructions are executable by the one or more processors to cause the one or more processors to generate the one or more limitations based on a category of the merchant and a history of fraudulent charges associated with the category of the merchant.

6. The temporary payment card security system of claim 2, wherein the instructions are executable by the one or more processors to cause the one or more processors to generate the one or more limitations based on a history of fraudulent charges on the account of the user, a history of fraudulent charges associated with a user location of the user, or both.

7. The temporary payment card security system of claim 2, wherein the one or more limitations comprise a purchase location limit, a purchase amount limit, and a purchase time limit.

8. The temporary payment card security system of claim 1, wherein the instructions are executable by the one or more processors to cause the one or more processors to prompt the user to provide an input of approval prior to providing the respective unique payment card number of the payment card to the payment transaction system associated with the merchant.

9. The temporary payment card security system of claim 1, wherein the payment card is a one-time use payment card.

10. The temporary payment card security system of claim 1, wherein the indication that the user associated with the account is attempting to complete the transaction with the merchant comprises a communication from the payment transaction system associated with the merchant.

11. A temporary payment card security system, comprising:
one or more processors;
memory storing instructions executable by the one or more processors to cause the one or more processors to:
receive a request for additional payment information associated with an account of a user;
assess security factors associated with the request, wherein the security factors are indicative of a risk of fraudulent transactions;
determine a quantity of one or more additional payment cards to be generated based on the security factors;
generate the quantity of the one or more additional payment cards;
set a boundary for a transaction device based on respective location data of prior transactions completed at the transaction device;
assign one or more limitations to the one or more additional payment cards, wherein the one or more limitations comprise a purchase location limit that limits use of the one or more additional payment cards within the boundary surrounding the transaction device associated with the request;
associate the one or more additional payment cards with the account of the user;
provide a representation of the one or more additional payment cards to a user device associated with the user for display on a display screen of the user device, wherein the representation is selectable to enable the user to view details about the one or more limitations assigned to the one or more additional payment cards, wherein the details comprise a visualization of the boundary associated with the purchase location limit overlaid onto a map; and
instruct removal of the representation of the one or more additional payment cards from the display screen of the user device based on new location data of the user device indicating the user is no longer within the boundary for the transaction device.

12. The temporary payment card security system of claim 11, wherein the instructions are executable by the one or more processors to cause the one or more processors to adjust the boundary for the purchase location limit based on an input from the user at the user device.

13. The temporary payment card security system of claim 11, wherein the request for the additional payment information comprises an indication that the user is attempting to complete a transaction with a merchant.

14. The temporary payment card security system of claim 11, wherein the instructions are executable by the one or more processors to cause the one or more processors to block future transactions with the one or more additional payment cards that do not correspond to the one or more limitations.

15. The temporary payment card security system of claim 11, wherein the quantity comprises a first quantity of the one or more additional payment cards upon determining that the security factors are above a threshold, and the quantity comprises a second quantity of the one or more additional payment cards upon determining that the security factors are not above a threshold.

16. A method of operating a temporary payment card security system, the method comprising:
setting, using one or more processors a boundary for a merchant location based on respective location data of prior transactions completed at the merchant location;
determining, using the one or more processors, that a user is at the merchant location of the merchant based on location data of a user device associated with the user being within the boundary for the merchant location, wherein the location data of the user device is indicated by global positioning system (GPS) location signals received from the user device;
assessing, using the one or more processors, security factors associated with the merchant location of the merchant, wherein the security factors are indicative of a risk of fraudulent transactions;
receiving, at the one or more processors, an indication that the user is attempting to complete a transaction with the merchant;
generating, using the one or more processors, a payment card associated with an account and with one or more limitations based on the security factors associated with the merchant location of the merchant in response to receiving the indication;
providing, using the one or more processors, a respective unique payment card number of the payment card to a payment transaction system associated with the merchant;
instructing, using the one or more processors, display of a representation of the payment card to the user device associated with the user for display on a display screen of the user device, wherein the representation is selectable to enable the user to view details about the one or more limitations, wherein the details comprise a visualization of the boundary for the merchant location overlaid onto a map; and instructing, using the one or more processors, removal of a respective representation of a first additional payment card of the one or more payment cards from the display screen of the user device based on a location of the user device being outside of the boundary associated with the merchant location, wherein the location of the user device is indicated by additional location signals transmitted from the user device.

17. The method of claim 16, comprising: blocking, using the one or more processors, future transactions with the payment card that do not correspond to the one or more limitations.

* * * * *